United States Patent Office 3,348,608
Patented Oct. 24, 1967

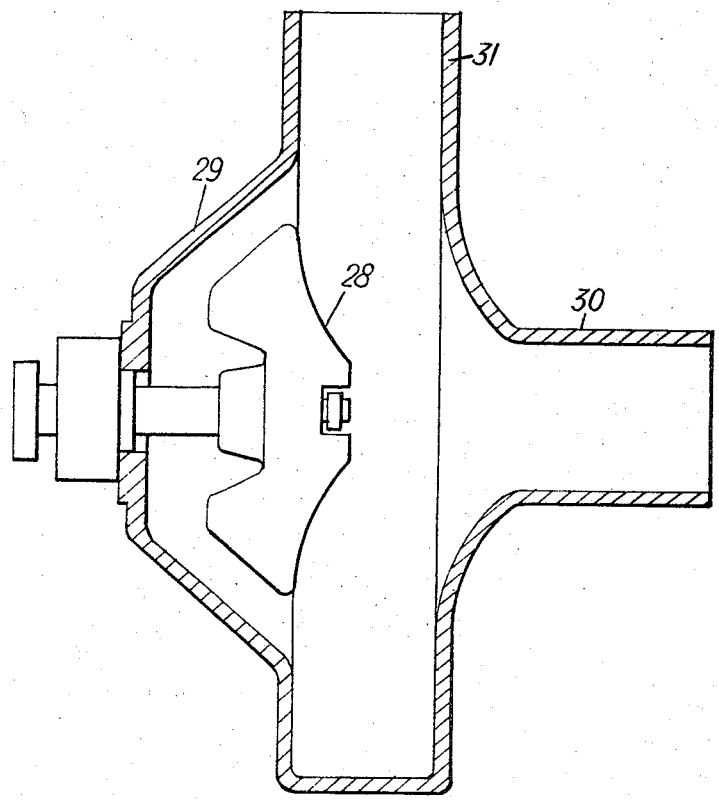

3,348,608
APPARATUS FOR HEAT OR COLD TREATING
MATERIAL UNDER PRESSURE
Thomas Sydney Ling, Levenbank, Leven, Fife, and Samuel Wilfred Maxfield, Leven, Fife, Scotland, assignors to George Scott & Son (London) Limited, a British company
Filed Feb. 4, 1966, Ser. No. 525,014
6 Claims. (Cl. 165—40)

ABSTRACT OF THE DISCLOSURE

Apparatus for heat and cold treating material in a pressurised vessel, the material being force fed into the vessel by an open impeller type centrifugal pump. The vessel contains agitators for moving the material through the vessel to the vessel outlet. The delivery of a second open impeller type centrifugal pump is connected to the vessel outlet, the treated material passing out through the pump in contra-flow to the operation of the pump. The rate of removal of material from the vessel is controlled by the pump speeds.

---

Figure 1:
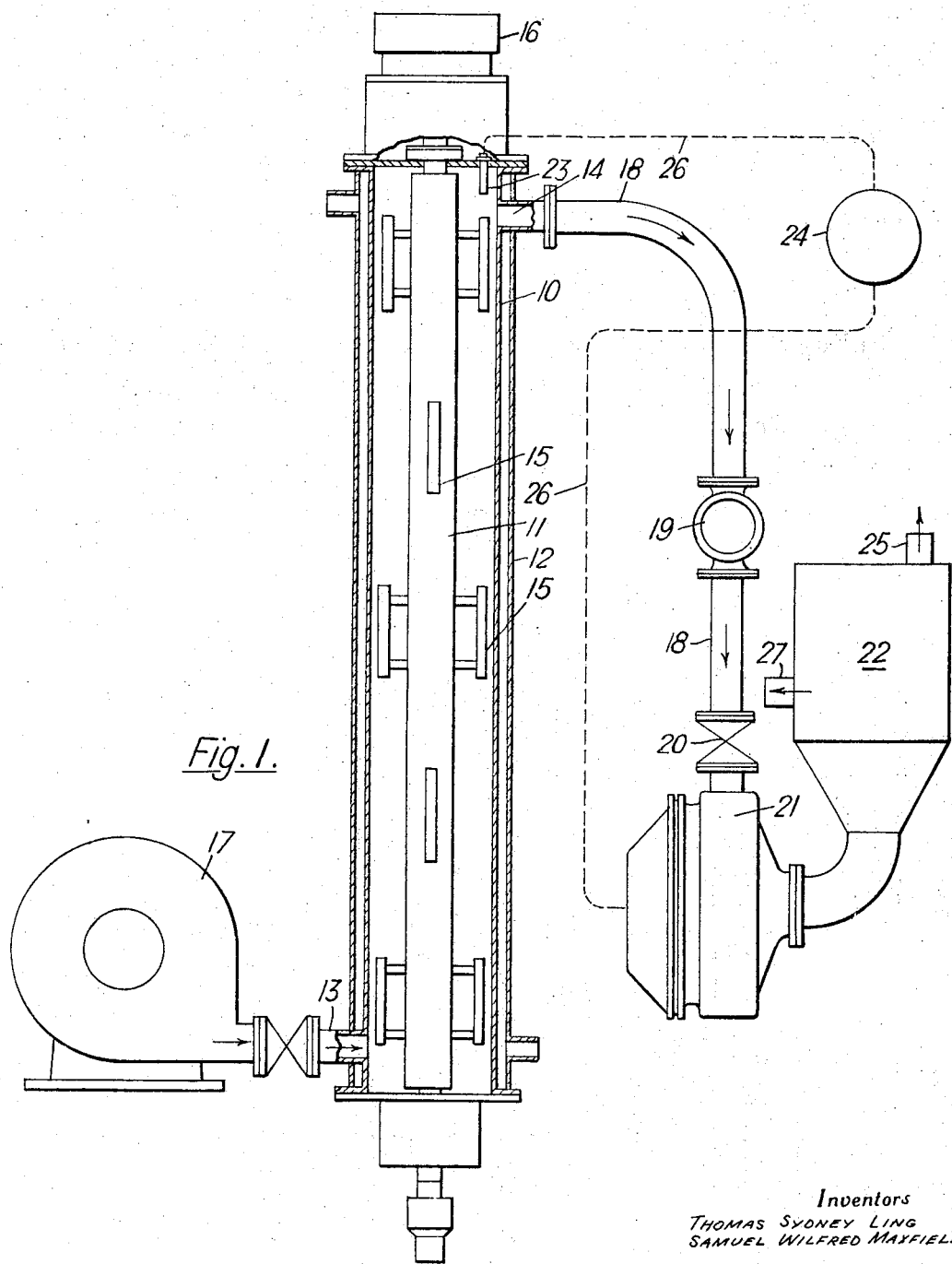

This invention relates to apparatus for heat or cold treating material under pressure.

According to the present invention there is provided apparatus for heat or cold treating material under pressure, the apparatus including a pressure vessel, an inlet for feeding the material into the vessel, an outlet from the vessel, a pump for maintaining the pressure in the vessel, the delivery of the pump being connected to the outlet, the material from the vessel after treatment passing through the pump in contra-flow to the operation of the pump, means for heating or cooling the vessel as desired, means sensitive to the pressure or a predetermined pressure within the vessel and arranged to control the speed of the pump to control the rate of removal of treated material from the vessel to tend to maintain the pressure at a predetermined level within the vessel.

Preferably the pump is of the open impeller type driven by a variable speed electric motor, and a second pump of the same type and driven by a variable speed electric motor is provided for feeding the material through the inlet into the vessel.

Preferably the pressure vessel is cylindrical and contains an axial shaft and means for rotating the shaft, the shaft having means on it for moving or agitating any material in the vessel upon rotation of the shaft.

Preferably, also, the inlet and outlet are at opposite ends of the cylindrical pressure vessel which may be upright, inclined or horizontal, with the inlet where possible at the bottom end.

The means for heating or cooling the vessel may be a jacket around the vessel for hot or cold fluid as the case may be, and the axial shaft may be hollow for the same purpose.

An embodiment of the present invention will now be described, by way of example, with reference to the accompanying drawings, in which:

FIG. 1 is a schematic sectional view of one form of apparatus according to the present invention, and FIG. 2 is a schematic sectional view of one form of open impeller type pump.

Referring to the drawings, the apparatus comprises a cylindrical upright pressure vessel 10, made of stainless steel or mild steel or any suitable material, having an axial hollow shaft 11 within it and a jacket 12 around it, inlet and outlet ports 13, 14 being provided adjacent the bottom and top ends respectively of the vessel. Hot or cold fluid, as the case may be, is circulated, separately, through the jacket 12 and may also be circulated through the inside of the hollow shaft 11 to achieve the desired treatment of the material in the vessel.

The shaft 11 has a number of radially-extending agitators 15 and is drive-connected to an electric motor 16 to rotate it within the cylindrical pressure vessel 10. It should be understood that, instead of the agitators, the shaft could have a helical screw or paddles or any other arrangement of protrusions for moving or agitating any material in the vessel and they could be arranged also to scrape the inside wall of the vessel to ensure the maximum rate of heat exchange between the respective contents of the vessel and the jacket.

The inlet port 13 to the pressure vessel is fed by a feed pump 17 driven by a manually adjustable variable speed electric motor (not shown) and may be of the open impeller type. The outlet port 14 from the pressure vessel discharges, by way of a conduit 18, a sight glass 19 in the conduit, and a valve 20, into the discharge branch, serving in this instance as the inlet to the pump, of a reversed discharge pump 21 of the open impeller type driven by a variable speed electric motor and delivering into a collection tank 22. An example of a suitable type of pump would be the Scott Wemco Torque-Flow pump manufactured by us and as shown in FIG. 2. In the normal operation of this pump a recessed impeller 28, located in the pump casing 29 out of the flow pattern, imparts a swirling action to the material being sucked into the pump and the pump suction and discharge passages are one continuous passage from axial pump suction 30 to radial pump delivery 31.

A pressure-sensitive device 23, the setting of which can be varied, is installed within the pressure vessel 10 at the top thereof and is connected (as illustrated schematically by the dotted line 26) through appropriate electrical control gear 24 to the variable speed motor of the discharge pump 21 to control the speed of this motor and thus the pump 21 in accordance with the pressure in the vessel. Thus the rate of removal of material from the vessel is controlled to tend to maintain the pressure within the pressure vessel at a predetermined level, and should that pressure drop or drop beneath a predetermined level the motor and thus the pump 21 will be speeded up and vice versa.

In use, the flow of heating or cooling fluid to the jacket 12 and the hollow shaft 11 is started and the feed pump 17 is started to feed the material to be treated into the pressure vessel 10. With the shaft 11 being rotated within the vessel to agitate or move the material in the vessel, the feed pump 17 ultimately fills the vessel with material until it overflows out through the outlet port 14 (a suitable vent being provided to vent initially any air or gaseous medium which may be present) and can be seen passing through the sight glass 19 in the conduit 18, the valve 20 at the suction of the discharge pump 22 being closed at this stage.

When the level of material in the conduit can be seen in the sight glass, the discharge pump is started and the valve 20 opened, to enable the material to be continuously discharged through the pump to the collection tank 22.

The pressure sensitive device 23, having been pre-set to sense variations from a desired pressure, for example 40 pounds per square inch within the vessel, will control the speed of the discharge pump to give a delivery pressure corresponding to 40 pounds. Should the delivery pressure exceed 40 pounds, material will pass through the pump into the collection tank where the pressure will be reduced to atmospheric pressure by means of a vent 25, whilst at the same time the material will pass out through a duct 27 in the collection vessel.

If single pumps are insufficient for feeding or discharging the pressure vessel, by reason of either pressure or quantity, then multiple pumps may be used in series or parallel as may be required.

Examples of the applications to which apparatus according to the present invention could be put, would be continuously cooking materials, for example cereals including maize et cetera, or meat and bone materials previously size reduced; continuous digestion of pump and paper materials including wood chips; as a cooker or steriliser in the food industry; or as a reactor for either heating or cooling whilst simultaneously carrying out a reaction under pressure as in the chemical industry.

We claim:

1. Apparatus for heat and cold treating material under pressure, the apparatus including a pressure vessel, means for heating and cooling the vessel as desired, an inlet in the pressure vessel for inlet of the material into the vessel, an outlet from the vessel, first pump means for maintaining the pressure in the vessel, the delivery of said pump means being connected to said outlet and the material from the vessel after treatment passing through the pump means in contra-flow to the operation of the pump means, pressure sensitive means within the vessel arranged to control the speed of said pump means and therewith the rate of removal of treated material from the vessel, and second pump means provided for force feeding the material through the inlet into the vessel, the delivery of said second pump means being connected to the pressure vessel inlet.

2. Apparatus as claimed in claim 1, in which each said pump means is of the open impeller type.

3. Apparatus as claimed in claim 2, in which the pressure vessel is cylindrical, and including an axial shaft in the pressure vessel, means for rotating the shaft and means on the shaft for moving and agitating any material in the vessel upon rotation of the shaft.

4. Apparatus as claimed in claim 3, in which the inlet and outlet are at opposite ends of the cylindrical pressure vessel, with the inlet at the bottom end when the pressure vessel is arranged at an orientation other than horizontal.

5. Apparatus as claimed in claim 3, in which the means for heating and cooling the vessel is a jacket around the pressure vessel for hot and cold fluid as the case may be, and the axial shaft is hollow for the same purpose.

6. Apparatus for heat and cold treating material under pressure, the apparatus including a cylindrical pressure vessel, a hollow axial shaft in said pressure vessel, means for rotating said shaft, means on the shaft for moving and agitating any material in the vessel upon rotation of the shaft, means for heating and cooling the vessel as desired and including a jacket around the vessel for hot and cold fluid as the case may be, the axial shaft being hollow for the same purpose, an inlet in the pressure vessel for inlet of the material into the vessel, an outlet from the vessel, first pump means for maintaining the pressure in the vessel, the delivery of said pump means being connected to said outlet and the material from the vessel after treatment passing through the pump means in contra-flow to the operation of the pump means, pressure sensitive means within the vessel arranged to control the speed of the pump means to control the rate of removal of treated material from the vessel, and second pump means provided for force feeding the material through the inlet into the vessel, the delivery of said second pump means being connected to the pressure vessel inlet, and each said pump means being of the open impeller type driven by a variable speed electric motor.

References Cited

UNITED STATES PATENTS

| 2,030,734 | 2/1936 | Baird | 165—109 X |
| 2,512,045 | 6/1950 | Steinberg et al. | 165—31 |
| 2,604,500 | 7/1952 | Koning | 165—109 |
| 2,675,493 | 4/1954 | Grobel | 165—38 X |

FOREIGN PATENTS 928,006   6/1963   Great Britain.

ROBERT A. O'LEARY, *Primary Examiner.*

M. A. ANTONAKAS, *Assistant Examiner.*